US012560884B2

(12) United States Patent
Higaki et al.

(10) Patent No.: US 12,560,884 B2
(45) Date of Patent: Feb. 24, 2026

(54) IMAGE FORMING APPARATUS

(71) Applicants: Hideto Higaki, Kanagawa (JP); Susumu Narita, Kanagawa (JP)

(72) Inventors: Hideto Higaki, Kanagawa (JP); Susumu Narita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/891,124

(22) Filed: Sep. 20, 2024

(65) Prior Publication Data

US 2025/0138466 A1 May 1, 2025

(30) Foreign Application Priority Data

Oct. 30, 2023 (JP) ................................ 2023-185627
Jun. 24, 2024 (JP) ................................ 2024-101144

(51) Int. Cl.
*G03G 15/00* (2006.01)
*G03G 21/16* (2006.01)

(52) U.S. Cl.
CPC ....... *G03G 15/657* (2013.01); *G03G 15/6552* (2013.01); *G03G 21/1647* (2013.01)

(58) Field of Classification Search
None
See application file for complete search history.

(56) References Cited

U.S. PATENT DOCUMENTS 8,600,267 B2 * 12/2013 Sato .................. G03G 15/0889 399/119
2009/0022520 A1 1/2009 Sakaue et al.
2009/0058981 A1 3/2009 Higaki et al.
2009/0066780 A1 3/2009 Bannai et al.
2010/0321461 A1 12/2010 Shoji et al.
2014/0354757 A1 12/2014 Narita et al.
2015/0203308 A1 7/2015 Higaki
2016/0161906 A1 6/2016 Watanabe et al.
2023/0308566 A1 9/2023 Sakaue et al.

FOREIGN PATENT DOCUMENTS

CN 104914691 A * 9/2015 ......... G03G 21/1803
JP S62-270968 A 11/1987
JP 2002-244396 A 8/2002
JP 2011-107318 A 6/2011
JP 2014-178341 A 9/2014

OTHER PUBLICATIONS

English translation of CN 104914691 A to Sato et al., publication date Sep. 16, 2015. (Year: 2015).*

* cited by examiner

*Primary Examiner* — Leslie J Evanisko
(74) *Attorney, Agent, or Firm* — Harness, Dickey & Pierce, P.L.C.

(57) ABSTRACT

An image forming apparatus includes a body; a sheet conveyor to convey a sheet in an interior of the body; a removable component detachably attachable to the interior of the body from one side face of the body. The sheet conveyor includes a sheet conveyance roller having: a first face to guide the sheet in the interior of the body; and a second face to guide the removable component during an attachment or a detachment of the removable component to or from the body.

12 Claims, 9 Drawing Sheets

IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-185627, filed on Oct. 30, 2023 and Japanese Patent Application No. 2024-101144, filed on Jun. 24, 2024, in the Japan Patent Office, the entire disclosure of which is hereby incorporated by reference herein.

BACKGROUND

Technical Field

The present disclosure relates to an image forming apparatus.

Related Art

Image forming apparatuses with a removable component accessed from the side of the apparatus are known.

In a typical image forming apparatus, a writing device, which is a removable component, is attached into and detached from the apparatus through its side.

To ensure stable attachment and detachment of components such as the writing device, it is common to attach a guide member, for guiding the component, to the main body of the image forming apparatus. However, this can increase costs and the size of the device due to the additional component.

SUMMARY

An embodiment of the present disclosure provides an image forming apparatus includes a body; a sheet conveyor to convey a sheet in an interior of the body; a removable component detachably attachable to the interior of the body from one side face of the body. The sheet conveyor includes a sheet conveyance roller having: a first face to guide the sheet in the interior of the body; and a second face to guide the removable component during an attachment or a detachment of the removable component to or from the body.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
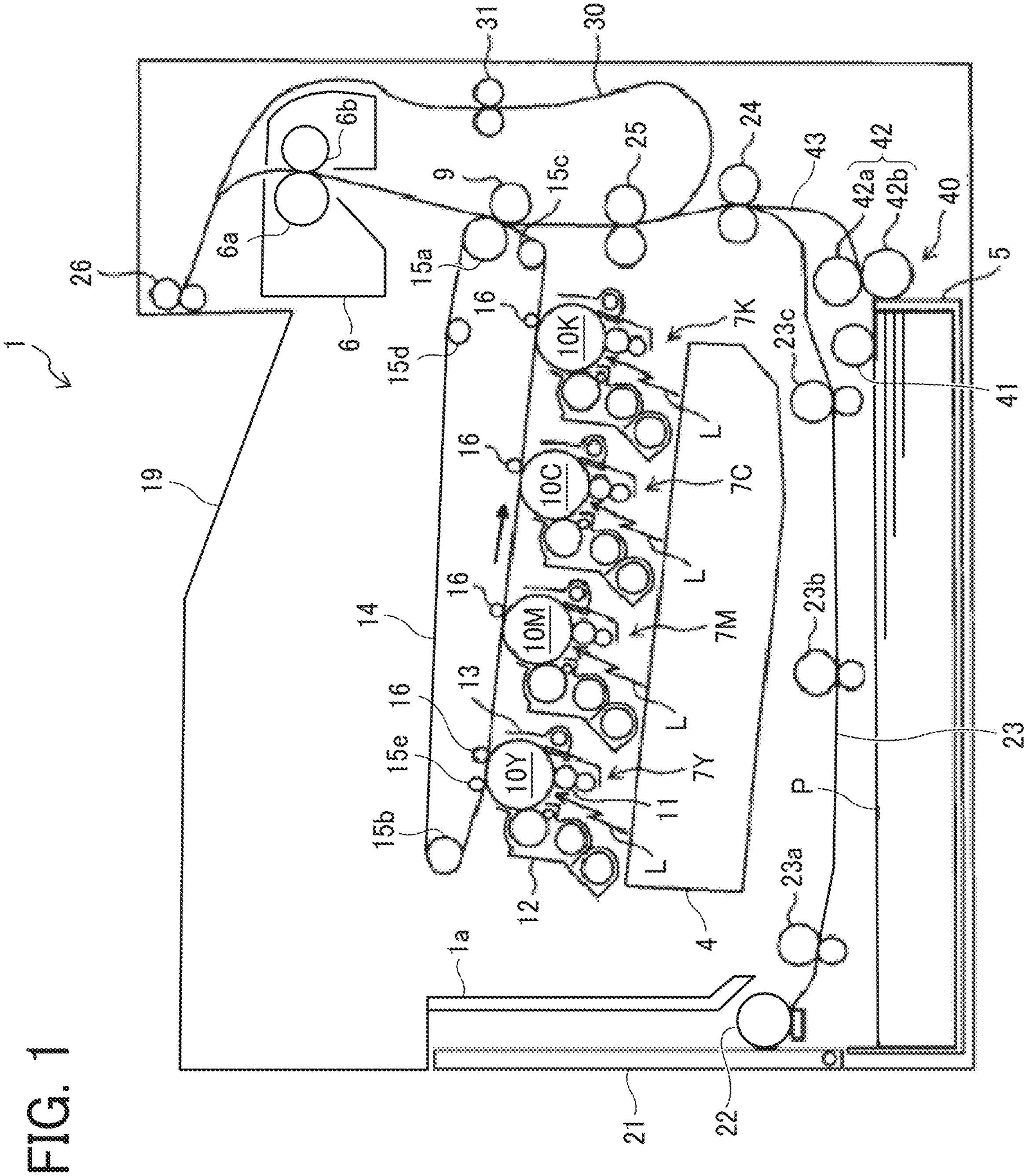
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to one aspect of the present disclosure, cost reduction and downsize of the device can be achieved.

Descriptions below are given of a sheet conveying device, an automatic document feeder, and an image forming apparatus, according to embodiments of the present disclosure, with reference to the accompanying drawings. It is to be understood that those skilled in the art can easily modify and change the present disclosure within the scope of the appended claims to form other embodiments, and these modifications and changes are included in the scope of the appended claims. The following description is an example of the best mode of the present disclosure, and does not limit the scope of the claims.

Initially with reference to FIG. 1, a description is given of an example of a color image forming apparatus.

FIG. 1 is a schematic diagram illustrating a configuration of an image forming apparatus according to the present embodiment as viewed from the front.

As illustrated in FIG. 1, the image forming apparatus 1 of the present embodiment is a full-color image forming device that arranges four drum-shaped photoconductors, 10Y, 10C, 10M, and 10K, in tandem as latent image carriers. These photoconductors are part of image-forming units 7Y, 7C, 7M, and 7K, which correspond to the colors yellow, cyan, magenta, and black, respectively, to produce color images. The image-forming units 7Y, 7C, 7M, and 7K are referred to collectively as an image-forming unit 7.

In the image forming apparatus 1 illustrated in FIG. 1, an intermediate transfer belt 14, serving as a surface-moving member, is supported and rotated by five support rollers 15*a*, 15*b*, 15*c*, 15*d*, and 15*e*. Along the lower span of the intermediate transfer belt 14, the image-forming units 7Y, 7C, 7M, and 7K are sequentially arranged at intervals in the direction of movement indicated by arrows, from upstream to downstream.

To form full-color images, toner images of the respective colors are created on photoconductors 10Y, 10C, 10M, and 10K, as described later. The toner images of different colors are then sequentially transferred onto the intermediate transfer belt 14 by primary transfer rollers 16 as transferers, which face the photoconductors, as the intermediate transfer belt 14 moves. Specifically, a portion of the intermediate transfer belt 14 with which the primary transfer roller 16 is in contact is referred to as a transfer position, and transfer is performed at the transfer position.

The four layered toner images are collectively transferred onto sheet P at a secondary transfer nip between a support roller 15*a* and a secondary transfer roller 9, and then fixed as they pass through fixing rollers 6*a* and 6*b* of a fixing device 6, before being output to a paper tray 19 by a discharge roller 26, producing a full-color image on the sheet.

The intermediate transfer belt 14 remains in constant contact with photoconductor 10K via the primary transfer roller 16 to accommodate the single black image formation mode, whereas for the other photoconductors, the intermediate transfer belt 14 can be engaged or disengaged by a movable tension roller. The image-forming unit 7, the intermediate transfer belt 14, the primary transfer roller 16, and the secondary transfer roller 9 constitute an image former that forms an image on a sheet. The image former includes a photoconductor.

Below the main body of the image forming apparatus, a sheet feed cassette 5 holds multiple sheets P, used for recording output images, and a sheet feeder 40 supplies these sheets. The sheet feeder 40 includes a pickup roller 41 that can engage and disengage with the sheets stacked in the sheet feed cassette 5, and a separation roller pair 42 that separates multiple sheets fed by the pickup roller 41 and feeds only the top sheet. The separation roller pair 42 includes a feed roller 42*a* and a reverse roller 42*b*. The feed roller 42*a* is driven by the force transmitted from a drive motor and rotates to move the sheet in the sheet feeding direction at the separation nip of the separation roller pair 42. The reverse roller 42*b* is also driven by the force transmitted from the drive motor via a torque limiter and rotates to move the sheet in a direction back toward the paper feed cassette (i.e., opposite to the sheet feeding direction) at the separation nip.

When a single sheet is held in the separation nip or no sheet is present, the rotational load on the reverse roller 42*b* is relatively high. As such, the torque on the reverse roller 42*b* exceeds a specified limit, causing the torque limiter to disconnect the drive from the motor, allowing the reverse roller 42*b* to idle and rotate along with the feed roller 42*a*.

When multiple sheets are held in the separation nip, the slippage between the sheets results in a relatively low rotational load on the reverse roller 42*b*. Consequently, the torque on the reverse roller 42*b* falls below the specified value, allowing the torque limiter to transmit the motor's drive force to the reverse roller 42*b*. As a result, the reverse roller 42*b*, driven by the motor, rotates in the direction that moves the sheets back toward the sheet feed cassette. This action returns the lower sheets, except for the topmost one, among the sheet held in the separation nip to the sheet feed cassette 5.

Sheets passing through the separation nip are transported by the relay conveyance roller 24 along a sheet feeding path 43 to the registration roller 25.

On the left side of the image forming apparatus in FIG. 1, a manual feed tray 21 for manual sheet feeding is placed on one side face of the body (or the main body). Between a writing device 4, which serves as a latent image writer or a removable component, and the sheet feed cassette 5, a manual relay conveyance path 23, including a manual conveyance path (or a sheet conveyance path) and a guiding path, is disposed. The manual conveyance path conveys the sheets P fed from the manual feed tray 21 to the junction with a sheet feeding path 43, using manual sheet feed rollers 22. The guiding path is used to guide the writing device 4 (or the removable component) from one side of the main body to a position in the interior of the main body during attachment of the writing device 4. Along or on the manual relay conveyance path 23, three manual relay conveyance rollers 23*a*, 23*b*, and 23*c* are disposed. The manual relay conveyance path 23 merges with the sheet feeding path 43 just before a relay conveyance roller 24. The manual relay conveyance rollers 23*a*, 23*b*, and 23*c* constitutes a sheet conveyor. The manual relay conveyance rollers 23*b* and 23*c*, as a sheet conveyance roller, each has a first face to guide a sheet in the interior of the body and a second face to guide the removable component during an attachment or a detachment of the removable component to or from the body. The sheet conveyor includes another sheet conveyance roller (e.g., the manual relay conveyance roller 23*a*) other than the sheet conveyance roller (e.g., the manual relay conveyance rollers 23*b* and 23*c*).

To the right of the fixing device 6 in the image forming apparatus, an inversion conveyance path 30 for conveying sheets P back to the secondary transfer nip during duplex printing is placed. The inversion conveyance path 30 includes an inversion conveyance roller 31.

In FIG. 1, the image-forming units 7Y, 7C, 7M, and 7K differ only in toner color; their mechanical structure and image-forming processes are the same. As such, components other than the photoconductors share like reference numbers, and the structure and image formation process are described using one unit, such as image-forming unit 7Y, as an example.

Around the photoconductor 10Y of the image-forming unit 7Y, the following components are arranged in a clockwise direction: a charging roller 11, which serves as a charger for charging the photoconductor 10Y, the exposure position of the light beam L a developing device 12, a primary transfer roller 16, and a cleaning device 13.

The light beam L is emitted from the writing device 4. The writing device 4 includes, for example, a semiconductor laser that serves as a light source, a coupling lens, an fθ lens, a toroidal lens, a mirror, a rotating polygon mirror. The writing device 4 emits light beams L for the respective colors to the photoconductors, and irradiates a writing position on the photoconductor 10Y with the light beam L to form an electrostatic latent image.

For example, in the developing device 12 of the image forming unit 7Y, a yellow developer is stored, and a latent image is visualized as a yellow image. The other image forming units also store developers of respective colors, and a latent image is visualized in its corresponding color of the developer stored in each unit.

During image formation, the photoconductor 10Y rotates and is uniformly charged by the charging roller 11. It is then exposed to the light beam L, which contains yellow image information at the writing position, forming an electrostatic latent image. This latent image is developed into a visible image using yellow toner as it passes through the developing device 12.

The yellow toner image on the photoconductor 10Y is transferred to the intermediate transfer belt 14 by the primary transfer roller 16. The yellow toner image on the intermediate transfer belt 14 is sequentially overlaid with a cyan toner image in the image forming unit 7C, a magenta toner image in the image forming unit 7M, and a black toner image in the image forming unit 7K. This process creates a full-color toner image.

After transfer, the residual toner on the photoconductor is removed by the cleaning device 13 and then discharged by the discharge lamp in preparation for the next image formation.

The sheet P is fed from either the sheet feed cassette 5 or the manual feed tray 21 and stops temporarily when it reaches the registration roller 25. At a predetermined timing, the registration roller 25 rotates to feed the sheet P toward the nip between the support roller 15*a* and the secondary transfer roller 9.

The full-color toner image overlaid on the intermediate transfer belt 14 is secondarily transferred onto the sheet P at the secondary transfer nip between the support roller 15*a* and the secondary transfer roller 9. The sheet P, onto which the full-color toner image has been transferred, is conveyed to the fixing device 6 and passes through the fixing nip. The toner image on the sheet P is heated and fixed by the heat from the fixing roller 6*a* at the fixing nip. For single-sided printing, the sheet P with the fixed toner image is discharged outside the machine by the discharge roller 26. For double-sided printing, after the image is formed as described above, the sheet P is switched back by the discharge roller 26, conveyed to the reverse conveyance path 30, and then fed into the sheet feeding path 43 with its sides reversed. An image is formed on the reverse side, as described above, before being discharged outside the machine.

Figure 2:
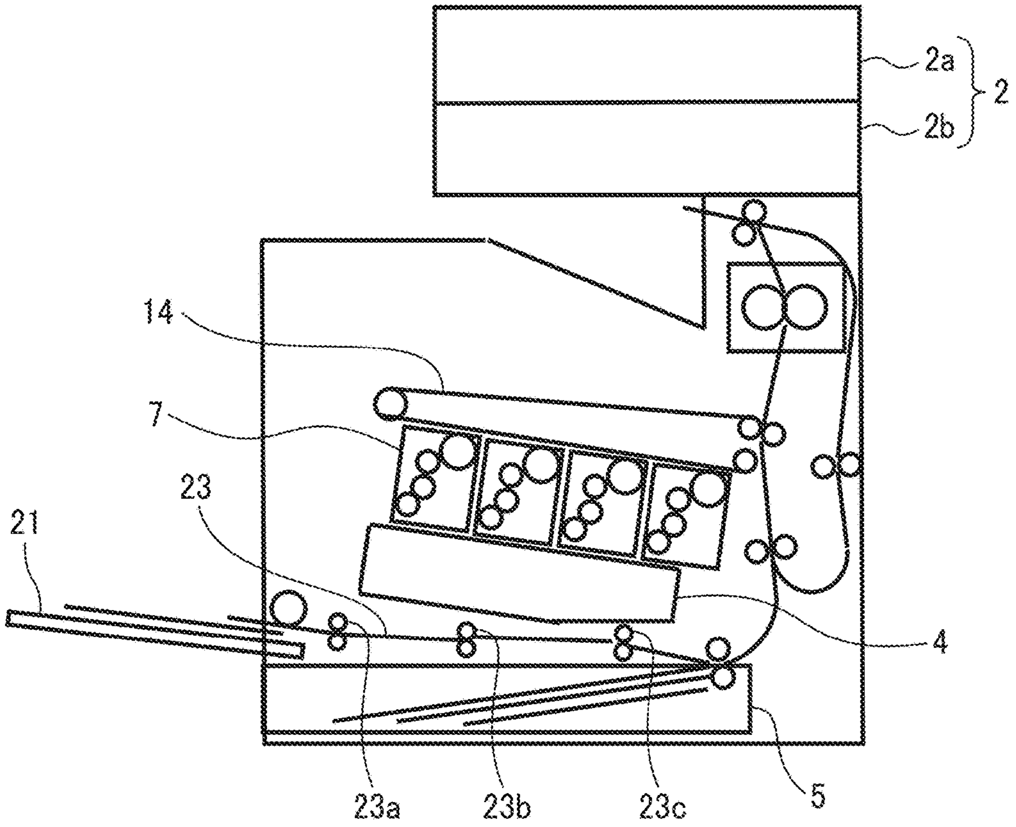
FIG. 2 is a schematic view of a configuration of an image forming apparatus with an image reading apparatus on its top.

Additionally, as illustrated in FIG. 2, the image forming apparatus 1 may be equipped with an image reading apparatus 2, which has a scanner 2*b* and an automatic document feeder (ADF) 2*a* on its top.

Figure 3:
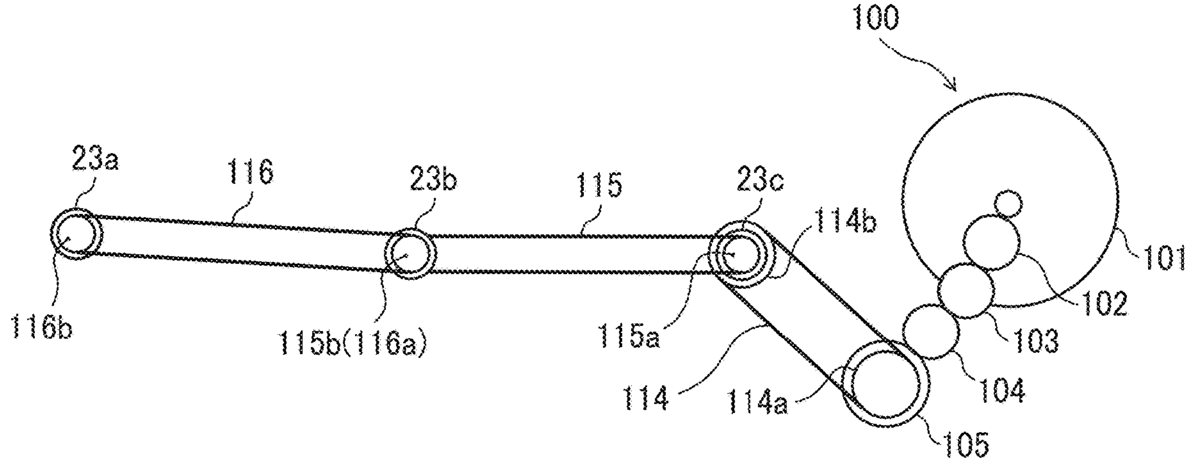
FIG. 3 is a schematic diagram of a drive device that rotates three manual relay conveyance rollers in a manual relay conveyance path.

FIG. 3 is a schematic diagram of a drive device 100, which rotates the three manual relay conveyance rollers 23*a*, 23*b*, and 23*c* in the manual relay conveyance path 23.

The drive device 100 includes a motor 101 as a driving source, multiple gears 102 to 104, an electromagnetic clutch 105, and multiple timing belts 114 to 116.

A first timing belt 114 is tensioned between a pulley 114*a* fixed to the shaft with the electromagnetic clutch 105 and a pulley 114*b* fixed to the shaft of a third manual relay conveyance roller 23*c*.

A second timing belt 115 is tensioned between a pulley 115*a* fixed to the shaft of the third manual relay conveyance roller 23*c* and a pulley 115*b* fixed to the shaft of the second manual relay conveyance roller 23*b*. A third timing belt 116 is tensioned between a pulley 116*a* fixed to the shaft of the second manual relay conveyance roller 23*b* and a pulley 116*b* fixed to the shaft of the first manual relay conveyance roller 23*a*.

The electromagnetic clutch 105 engages and turns on to transmit the driving force from the motor 101 to the relay conveyance rollers 23*a* to 23*c* when a sheet set on the manual feed tray 21 is fed. After the feeding is completed, the electromagnetic clutch 105 disengages and turns off, stopping the transmission of the driving force from the motor 101 to the relay conveyance rollers 23*a* to 23*c*.

Figure 4:
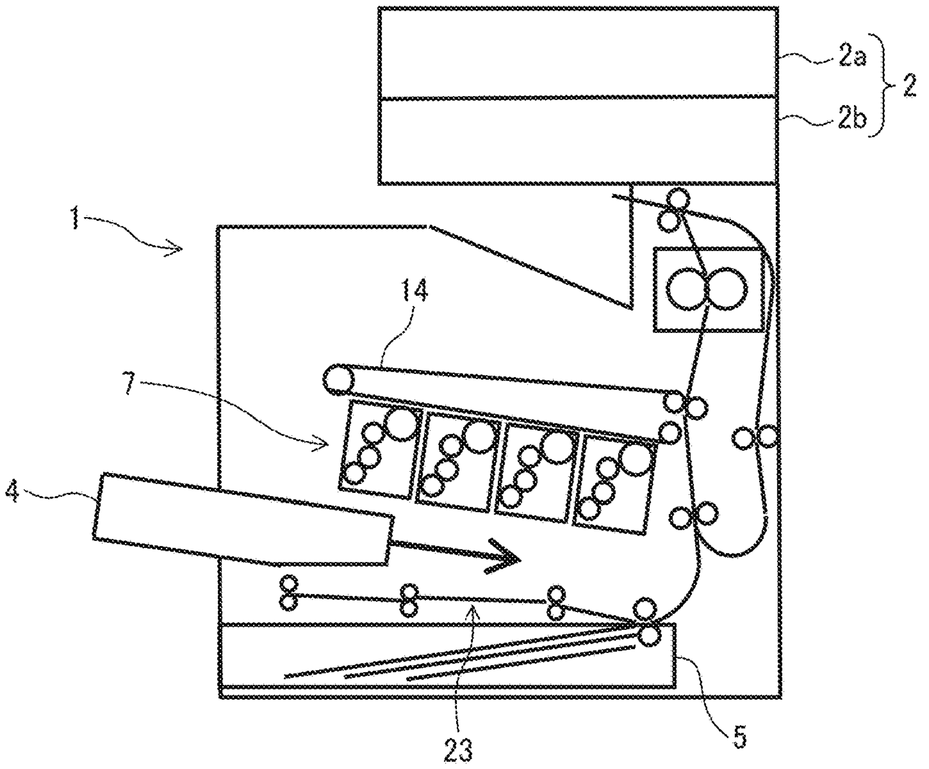
FIG. 4 is a diagram illustrating an attachment direction in which a writing device is attached into a main body of an image forming apparatus.

As illustrated in FIG. 4, the writing device 4, which is a removable component, is configured to be attached and detached through the side opening that is exposed by removing the side cover 1*a* (see FIG. 1) on the side where the manual feed tray 21 of the image forming apparatus 1 is located. As illustrated in FIG. 4, the writing device 4 is attached and detached from the main body of the image forming apparatus by reciprocating movement directly above the manual relay conveyance path 23, in a direction nearly parallel to the sheet conveyance direction of the manual relay conveyance path 23. The writing device 4 (or the removable component) is detachably attachable to the interior of the body (or the main body of the image forming apparatus) from one side face of the body.

In the present embodiment, the writing device 4 is guided by the second manual relay conveyance roller 23*b* and the third manual relay conveyance roller 23*c*, which are sheet conveyance rollers, to achieve the attachment and detachment of the writing device 4 to the main body of the image forming apparatus. The features of the present embodiment will be described below.

Figure 5:
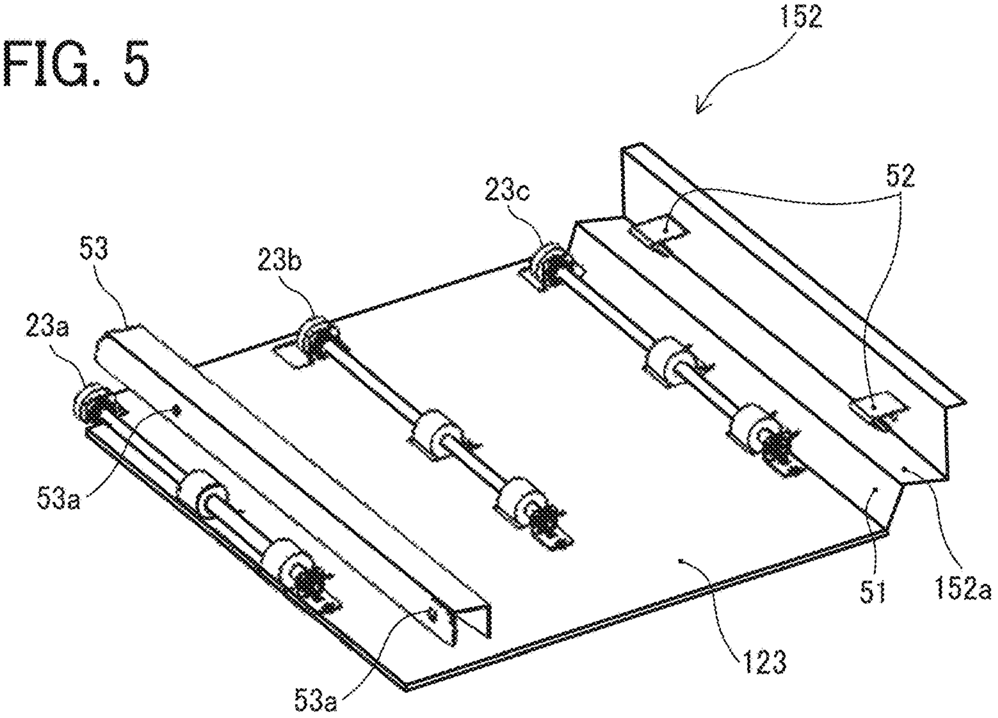
FIG. 5 is a perspective view of an upper sheet guide member of a manual relay conveyance path.

FIG. 5 is a perspective view of an upper sheet guide member 123 of the manual relay conveyance path 23. The sheet conveyor conveys a sheet in an interior of the body (or the main body of the image forming apparatus).

As illustrated in FIG. 5, the upper sheet guide member 123 rotatably supports each of the manual relay conveyance rollers 23*a* to 23*c*. Specifically, the shafts of the manual relay conveyance rollers 23*a* to 23*c* are rotatably supported by the upper sheet guide member 123 on the side opposite a sheet-guiding surface that guides a sheet. A portion of the roller sections of the manual relay conveyance rollers 23*a*, 23*b*, and 23*c* protrudes through openings in the upper sheet guide member 123 and comes into contact with driven rollers that rotate along with the manual relay conveyance rollers 23*a*, 23*b*, and 23*c*.

At the upstream end in the sheet conveyance direction on the side opposite the sheet-guiding surface of the upper sheet guide member 123, a stay member 53 is placed to position and support the upstream side of the writing device 4 attached inside the image forming apparatus in an attachment direction in which the writing device is attached inside the main body of the image forming apparatus. The stay member 53 is placed between the first manual relay conveyance roller 23*a* and the second manual relay conveyance roller 23*b*. On both sides of the stay member 53 in the sheet width direction (or a front-back direction of the image forming apparatus), female threaded portions 53*a* are placed, into which screws 53*b* (see FIGS. 8 and 9) are fastened, to secure a second fixing part 4*b* of the writing device 4 (see FIG. 7). A sheet conveyance roller (e.g., the manual relay conveyance rollers 23*b*, 23*c*) as a sheet conveyor has a first face to guide the sheet in the interior of the body and a second face to guide the removable component (e.g., the writing device 4) during an attachment or a detachment of the removable component.

At the downstream end in the sheet conveyance direction of the upper sheet guide member 123, a unit fixing portion 152 (or a fixed part) for securing the downstream end of the writing device 4 in the attachment direction to a position in the interior of the main body. At both ends of the unit fixing portion 152 in the sheet width direction (or the front-back direction of the image forming apparatus), fixing springs 52 in the form of a plate spring are placed for fixing a first fixing part 4*a* (see FIG. 7) at the downstream end of the writing device 4 in the attachment direction. The fixing springs 52 faces the placement platform 152*a* on which the first fixing part 4*a* (see FIG. 7) is placed with a predetermined clearance.

The upper sheet guide member 123 includes a fixing guide 51 that guides the first fixing part 4*a* (see FIG. 7) of the writing device 4 to the unit fixing portion 152. In other words, the fixing guide 51 guides a downstream end of the removable component (e.g., the writing device 4) toward the fixed part (e.g., unit fixing portion 152) in the attachment direction of the removable component to attach the removable component to the position in the interior of the body while separating the downstream end of the removable component from the sheet conveyance roller. The placement platform 152*a* is positioned higher than the manual relay conveyance rollers 23*a*, 23*b*, and 23*c*. The fixing guide 51 has an inclined surface that rises towards the unit fixing portion 152 (or in a downstream direction of the writing device in the attachment direction) and connects to the placement platform 152*a*.

The inclined surface of the fixing guide 51 is formed to seamlessly connect with the placement surface of the placement platform 152*a*.

Figure 6A:
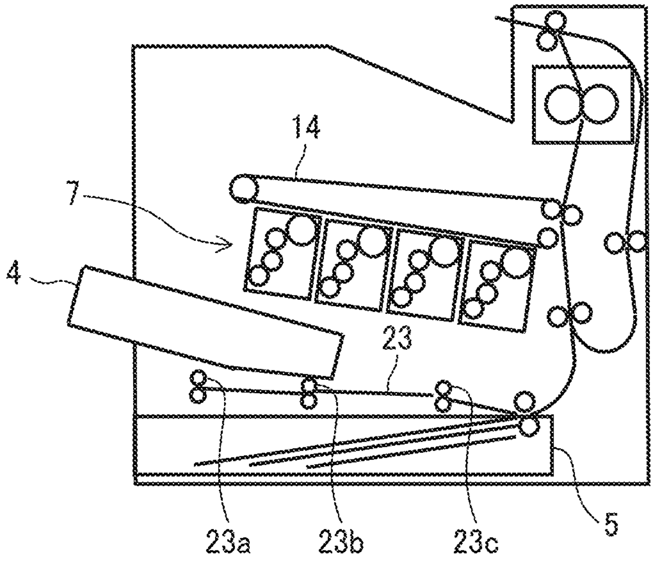
FIGS. 6A and 6B are diagrams each illustrating the attachment of a writing device to a main body of an image forming apparatus.
Figure 6B:
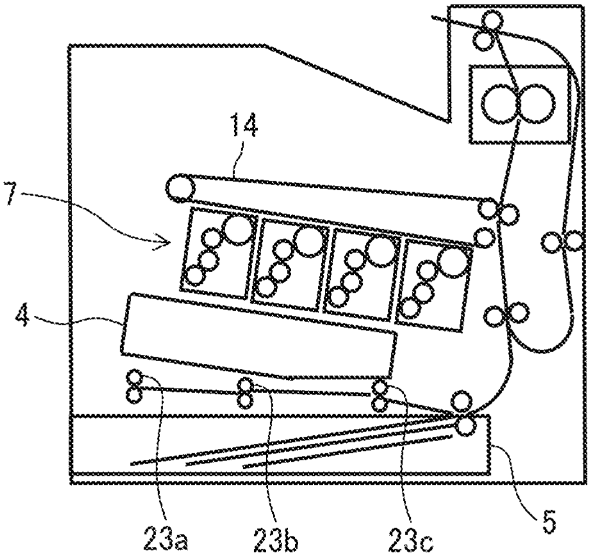

FIGS. 6A and 6B illustrate the attachment of the writing device 4 into the main body of the image forming apparatus.

As illustrated in FIGS. 6A and 6B, when attaching the writing device 4 to the main body of the image forming apparatus 1, the writing device 4 is inserted between the upper sheet guide member 123 and the image forming units 7, with the upstream portion of the writing device 4 in the attachment direction held to avoid contact with the stay member 53. Then, the downstream end of the bottom surface of the writing device 4 in the attachment direction will come into contact with the second manual relay conveyance roller 23*b*.

In the present embodiment, as described above, the electromagnetic clutch 105 is turned OFF, disconnecting it from the motor 101 except when feeding sheets from the manual feed tray 21. This allows the manual relay conveyance rollers 23*a*, 23*b*, and 23*c* to rotate freely as a single group via the second timing belt 115 and the third timing belt 116. In this configuration, as the downstream end of the writing device 4 contacts the second manual relay conveyance roller 23*b* and is pushed further, the second manual relay conveyance roller 23*b* rotates, smoothly guiding the writing device 4 in the attachment direction.

As the writing device 4 is inserted for attachment, as illustrated in FIG. 6B, the downstream end of the bottom surface of the writing device 4 in the attachment direction comes into contact with the third manual relay conveyance roller 23*c*. The third manual relay conveyance roller 23*c* rotates with the movement, guiding the writing device 4 as it is attached inside the image forming apparatus. The sheet conveyance roller (e.g., the third manual relay conveyance roller 23*c*) guides the writing device 4 (or the removable component) from one side face of the body (e.g., the main body) to a position in the interior of the body in an attachment-detachment direction during the attachment of the removable device along a guiding path. This configuration allows the writing device 4 to smoothly move in the attachment direction.

Figure 7:
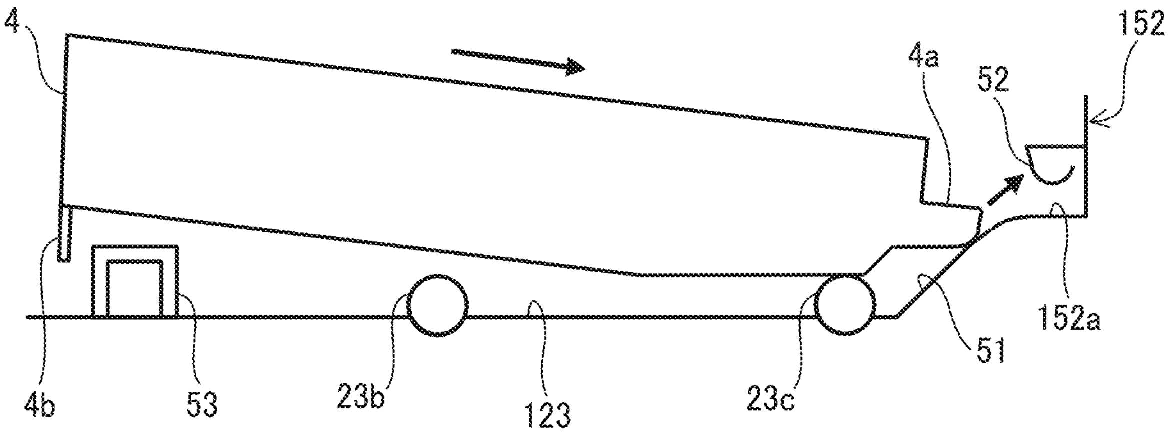
FIG. 7 is a schematic view of the writing device that has been further inserted into the main body of the image forming apparatus from the state illustrated in FIG. 6B.

FIG. 7 is a schematic view of the writing device 4 that has been further inserted into the main body of the image forming apparatus 1 in the downstream direction (or the attachment direction) from the state illustrated in FIG. 6B.

In FIG. 7, the downstream end of the writing device 4 in the attachment direction has a first fixing part 4*a* that protrudes in the attachment direction. The upstream end of the writing device 4 has a second fixing part 4*b* extending vertically downward. The first fixing part 4*a* and the second fixing part 4*b* are positioned on both sides of the writing device 4 in the sheet width direction (or the front-back direction of the image forming apparatus). In other words, one first fixing part 4*a* is at one end, and another first fixing part 4*a* is at the other end of the writing device 4 in the sheet width direction (or the front-back direction of the image forming apparatus). Further, one second fixing part 4*b* is at one end, and another second fixing part 4*b* is at the other end of the writing device 4 in the sheet width direction (or the front-back direction of the image forming apparatus). The second fixing part 4*b* has a through hole through which a screw 53*b* (see FIGS. 8 and 9) penetrates.

Figure 8:
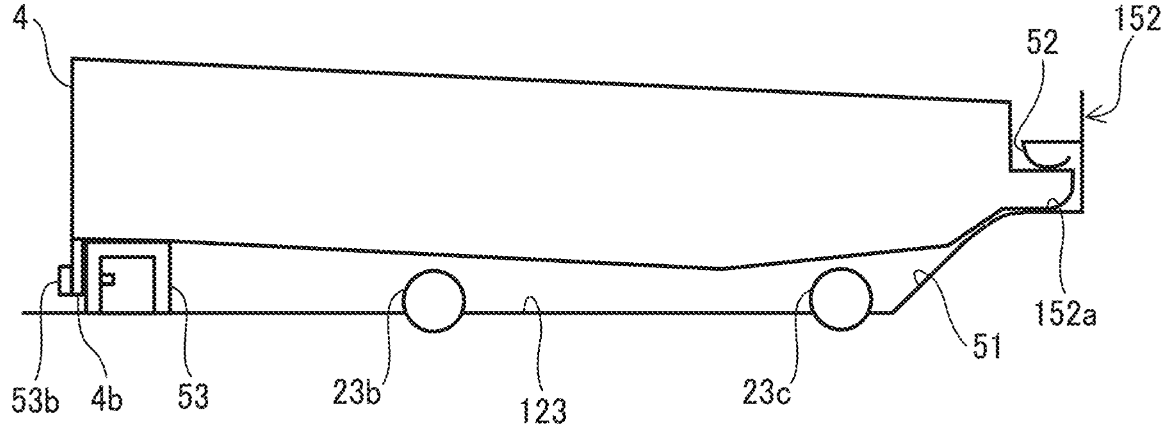
FIG. 8 is a schematic diagram of a writing device attached to the main body of an image forming apparatus.
Figure 9:
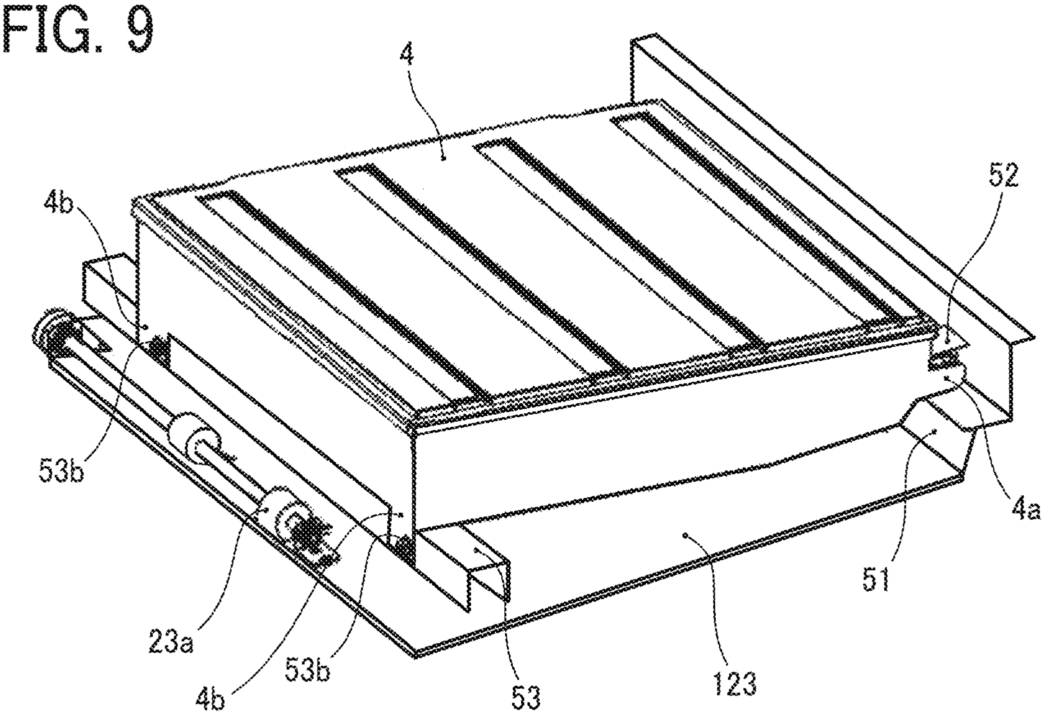
FIG. 9 is a schematic diagram of a writing device attached to the main body of an image forming apparatus.

In FIG. 7, as the writing device 4 is inserted into the main body of the image forming apparatus while being guided by the third manual relay conveyance roller 23*c*, the first fixing part 4*a* comes into contact with the fixing guide 51. As described above, the fixed guide 51 has an inclined surface that is positioned higher as it extends in the downstream direction of the writing device in the attachment direction. In this configuration, as the writing device 4, with the first fixing part 4*a* in contact with the fixing guide 51, is further inserted for attachment, the first fixing part 4*a* moves upward along the inclined surface of the fixing guide 51 and is guided toward the placement platform 152*a* of the unit fixing portion. Thus, the downstream end of the writing device 4 in the attachment direction is lifted, and the bottom surface of the writing device 4 is separated from the third manual relay conveyance roller 23*c*. The writing device 4 (or the removable component) is separated from the sheet conveyance roller (e.g., the third manual relay conveyance roller 23*c*) with the removable component attached to a position in the interior of the main body. As illustrated in FIGS. 8 and 9, the first fixing part 4*a* fits between the placement platform 152*a* of the unit fixing portion 152 and the fixing spring 52, and is clamped and secured between the placement platform 152*a* and the fixing springs 52.

When the writing device 4 can no longer be inserted further, with the first fixing part 4*a* clamped between the placement platform 152*a* and the fixing spring 52, the upstream end of the writing device 4 in the attachment direction is lowered and placed on the stay member 53. Then, as illustrated in FIGS. 8 and 9, the second fixing part 4*b* is secured to the stay member 53 by the screw 53*b*. Thus, the writing device 4 is positioned and secured to the main body of the image forming apparatus.

As illustrated in FIG. 8, as the writing device 4 is positioned and secured to the main body of the image forming apparatus 1, the writing device 4 is separated from the second manual relay conveyance roller 23*b* and the third manual relay conveyance roller 23*c*, which are used as the guides. This enables the smooth rotation of the second manual relay conveyance roller 23*b* and the third manual relay conveyance roller 23*c*. Thus, the occurrence of abnormal noise during the feeding of sheets from the manual feed tray 21, as well as the wear of the third manual relay conveyance roller 23*c*, can be reduced and prevented.

In the present embodiment, as described above, the second manual relay conveyance roller 23*b* and the third manual relay conveyance roller 23*c*, which are the functional components of the image forming apparatus 1, are used as guides for conveying. This configuration enables a reduction in the number of components, as well as the costs and size of the apparatus, compared to a configuration in which a separate guide for the writing device 4 is placed.

When the writing device 4 is removed from the main body of the image forming apparatus 1, the screw 53*b* is first removed. Then, by holding the upstream end of the writing device 4 in its attachment direction, it is pulled out from the opening on the side of the image forming apparatus 1, which is exposed by detaching the side cover 1*a* (see FIG. 1) where the manual feed tray 21 is located. Then, the first fixing part 4*a* is disengaged from between the placement platform 152*a* and the fixing spring 52, and is guided down along the inclined surface by the fixing guide 51. The downstream end of the writing device 4 in the attachment direction comes into contact with the third manual relay conveyance roller 23*c*, which rotates together with the movement of the writing device 4 and guides the writing device 4 in a removal direction in which the writing device 4 is pulled out of the image forming apparatus 1. When the writing device 4 is further pulled out, the downstream end of the writing device 4 in the attachment direction comes into contact with the second manual relay conveyance roller 23*b*. The writing device 4 is then transferred from the third manual relay conveyance roller 23*c* to the second manual relay conveyance roller 23*b*, which guides it as it is pulled out of the image forming apparatus 1.

Thereafter, the writing device 4 is lifted while being pulled out to avoid hitting the stay member 53, and is then removed from the main body of the image forming apparatus. As described above, during removal, the writing device 4 is guided by the second manual relay conveyance roller 23*b* and the third manual relay conveyance roller 23*c*, allowing the writing device 4 to be easily removed from the main body of the image forming apparatus.

Modifications of the present disclosure are described below.

Figure 10:
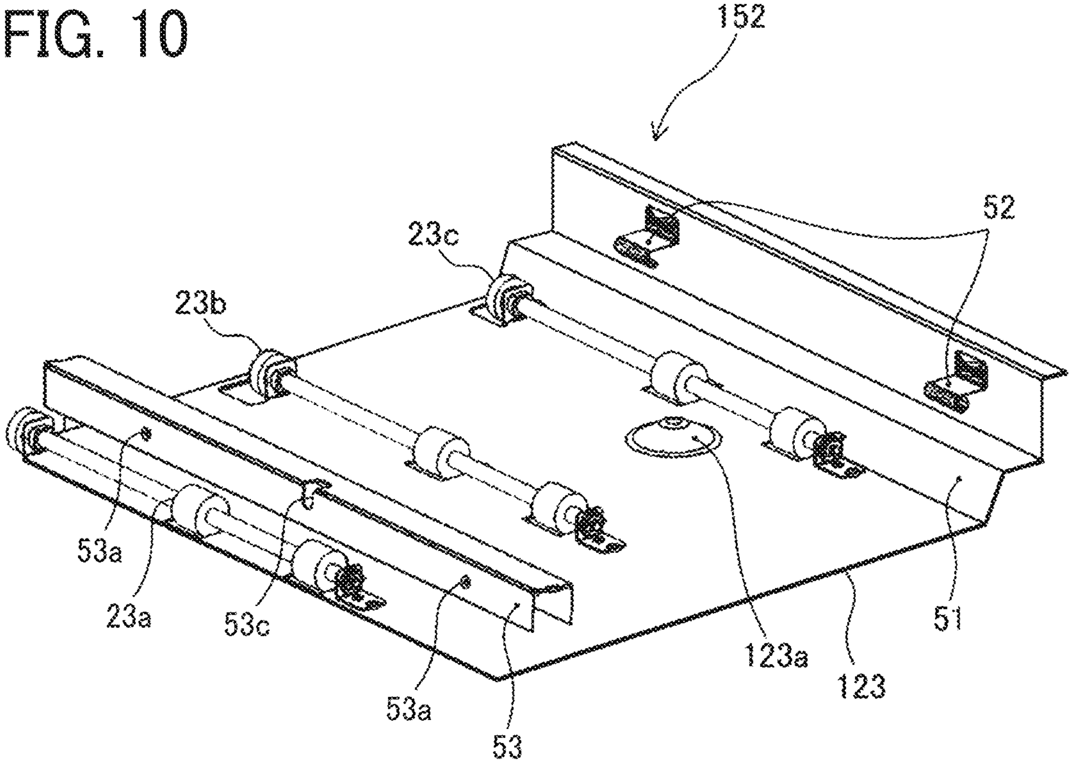
FIG. 10 is a perspective view of an upper sheet guide member of a manual relay conveyance path according to a modification of an embodiment of the present disclosure.

FIG. 10 is a perspective view of an upper sheet guide member 123 of a manual relay conveyance path 23 according to a modification of the present disclosure.

In the present modification, a guide protrusion 123*a*, which is a protrusion, is placed between the second manual relay conveyance roller 23*b* and the third manual relay conveyance roller 23*c* on the opposite side of a sheet-guiding surface that guides the sheets in the upper sheet guide member 123. The guide protrusion 123*a* is placed adjacent to the third manual relay conveyance roller 23*c* and near the center in the sheet width direction (or the front-back direction of the image forming apparatus).

The shape of the guide protrusion 123*a* is not limited to the shape illustrated in FIG. 10, and may instead be a rectangular parallelepiped extending in the attachment-detachment direction of the writing device 4 (or the horizontal direction of the image forming apparatus), in which the writing device as a removable component is guided by the sheet conveyance roller to be attached inside the image forming apparatus. Further, multiple guide protrusions 123*a* may be placed in the sheet width direction or the front-back direction of the image forming apparatus. With the arrangement of the multiple guide protrusions 123*a* in the sheet width direction, the tilting of the writing device 4 in the sheet width direction (or the front-back direction of the image forming apparatus can be prevented, stabilizing the position of the writing device 4 during its attachment.

However, placing one guide protrusion 123*a* can reduce costs. When one guide protrusion 123*a* is placed, it is preferable that the guide protrusion is placed near the center in the sheet width direction.

Compared to the case where only one guide protrusion 123*a* is placed at the end in the sheet width direction, placing multiple guide protrusions 123*a* helps to better reduce and prevent the tilting of the writing device 4 in the sheet width direction (or the front-back direction of the image forming apparatus while it is being guided.

In the present modification, a positioning groove 53*c* for positioning the writing device 4 in the sheet width direction is placed at the central portion of the stay member 53 in the sheet width direction (or the front-back direction of the image forming apparatus).

Figure 11:
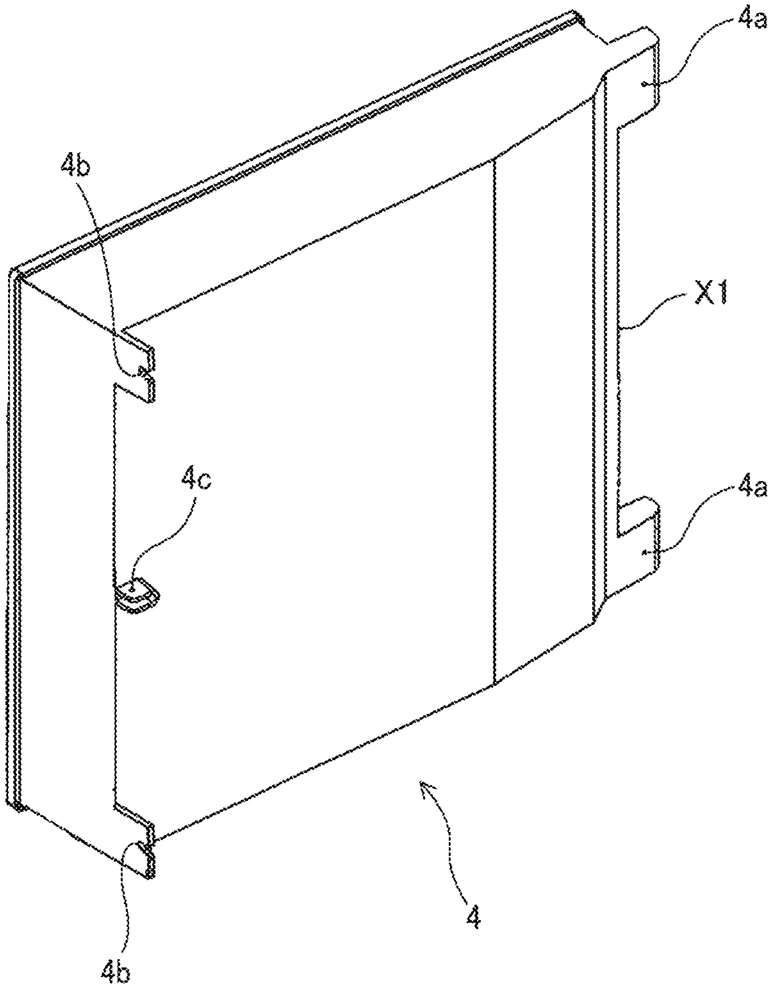
FIG. 11 is a perspective view of a writing device according to the modification of FIG. 10.

FIG. 11 is a perspective view of the writing device 4 according to the present modification. In FIG. 11, a positioning protrusion 4*c*, which protrudes vertically downward, is placed at the central portion of the upstream end of the writing device 4 in the attachment direction, along the sheet width direction.

Figure 12A:
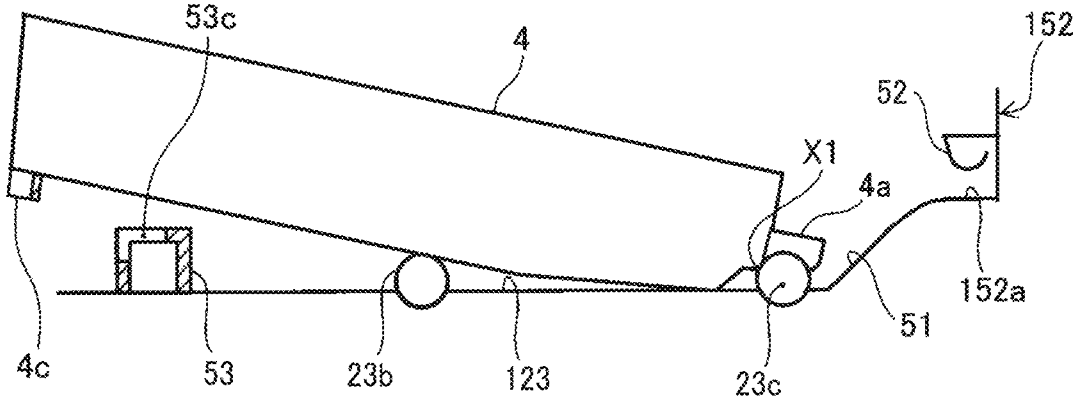
FIG. 12A is a diagram illustrating the attachment of a writing device without a guide protrusion.

As illustrated in FIG. 12A, if the guide protrusion 123*a* is not provided, depending on the insertion angle of the writing device 4 into the main body of the image forming apparatus 1, the downstream end X1 of the writing device 4 at the corner in the attachment direction may collide with the third manual relay conveyance roller 23*c*, potentially damaging the surface of the third manual relay conveyance roller 23*c*.

Figure 12B:
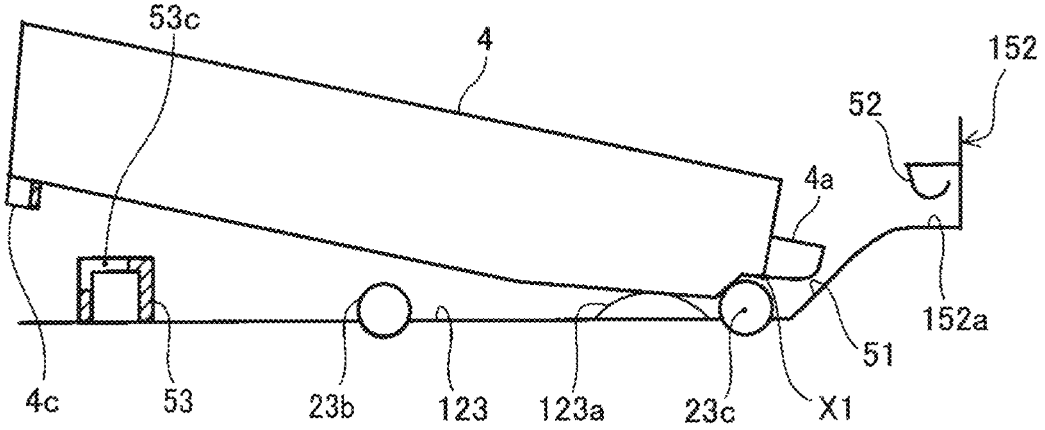
FIG. 12B is a diagram illustrating the attachment of a writing device provided with a guide protrusion.

However, as illustrated in FIG. 12B, with the guide protrusion 123*a*, the downstream end of the writing device 4 in the attachment direction is guided vertically upward by the guide protrusion 123*a*. Thus, the downstream end X1 of the writing device 4 at the corner is positioned higher than the peak or top of the third manual relay conveyance roller 23*c*. This prevents the downstream end X1 of the writing device 4 in the attachment direction from striking the third manual relay conveyance roller 23*c*. Thus, damage to the surface of the third manual relay conveyance roller 23*c* can be reduced. This configuration also enables the downstream end of the writing device 4 in the attachment direction to smoothly ride onto the third manual relay conveyance roller 23*c*, enhancing the attachability of the writing device 4 (or the ease of attaching the writing device 4) to the main body of the image forming apparatus 1.

Figure 13:
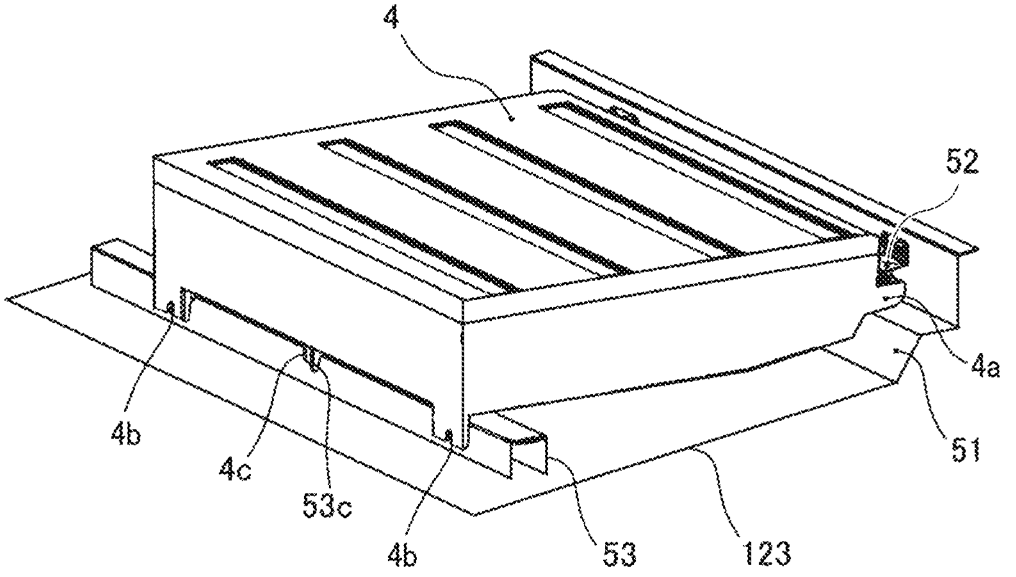
FIG. 13 is a schematic perspective view of the writing device according to the modification of FIG. 10, attached to the main body of the image forming apparatus.

After the first fixing part 4*a* is clamped between the placement platform 152*a* and the fixing spring 52, the downstream end of the writing device 4 in the attachment direction is lowered and placed on the stay member 53. Then, as illustrated in FIG. 13, the positioning protrusion 4*c* fits into the positioning groove 53*c* of the stay member 53. Thus, the writing device 4 is positioned in the sheet width direction (or the front-back direction of the image forming apparatus or the vertical direction of the image forming apparatus). In this way, the writing device 4 is positioned in the sheet width direction (or the front-back direction of the image forming apparatus or the vertical direction of the image forming apparatus), aligning the grooves, through which the screws 53*b* at the lower ends of the second fixing parts 4*b* pass, with the female threaded portions 53*a* of the stay member 53. This allows the second fixing part 4*b* to be easily secured to the stay member 53 using the screws 53*b*. Similarly to the present embodiment, the writing device 4 is positioned and secured in the left-right direction of the image forming apparatus (or the attachment-detachment direction of the writing device 4) by fixing the second fixing parts 4*b*, which are located on both sides of the writing device 4 in the horizontal direction of the writing device 4, to the stay member 53 using the screws 53*b*. Similarly to the present embodiment, the second fixing parts 4*b* are secured to the stay member 53 using the screws 53*b*, and the first fixing parts 4*a* are clamped and secured between the placement platform 152*a* and the fixing spring 52, positioning and securing the writing device 4 in the vertical direction.

The above-described embodiments are illustrative and do not limit the present disclosure. Thus, numerous additional modifications and changes are possible in light of the above teachings. For example, elements and/or features of different illustrative embodiments may be combined with each other and/or substituted for each other within the scope of the present disclosure.

For example, in a configuration where the image forming apparatus is arranged with the writing device 4, the image forming unit 7, and the intermediate transfer belt in that order from top to bottom, the intermediate transfer unit that includes the intermediate transfer belt and the primary transfer roller may be used as the removable component of the present embodiment. A control board or other circuit boards may be placed between the writing device 4 and the manual relay conveyance path 23, and these boards may also be used as removable component guided by the second manual relay conveyance roller 23*b* and the third manual relay conveyance roller 23*c*.

Furthermore, depending on the layout and configuration of the image forming apparatus, components such as the waste toner bottle or image forming unit can also be used as removable component guided by the second manual relay conveyance roller 23*b* and the third manual relay conveyance roller 23*c*.

Further, the conveyance rollers of the sheet conveyance path, which transport sheets in the attachment-detachment direction of the removable component and are positioned directly beneath the removable component, can be used as guides. The conveyance rollers are not limited to the second manual relay conveyance roller 23*b* and the third manual relay conveyance roller 23*c*.

Aspects of the present disclosure are as follows, for example.

Aspect 1

In an image forming apparatus 1 including a removable component, such as the writing device 4, that is attached and detached from a side surface of the image forming apparatus 1 in a horizontal direction of the image forming apparatus 1, into a main body of the image forming apparatus, the removable component is guided by a sheet conveyance roller (e.g., the second manual relay conveyance roller 23*b* and the third manual relay conveyance roller 23*c* of the present embodiment) to be attached to and detached from the body of the image forming apparatus 1.

According to this configuration of the present embodiment, guiding the removable component with the sheet conveyance rollers allows for stable attachment and detachment of the components. Additionally, by utilizing the sheet conveyance rollers, which are originally functional components of the image forming apparatus, as guides, the number of parts can be reduced, leading to cost savings and a more compact design of the apparatus.

Aspect 2

In Aspect 1, the removable component includes the writing device 4 that writes a latent image on the photoreceptor 10.

This allows for stable attachment and detachment of the writing device 4 as a removable component, while also reducing the number of parts, leading to cost savings and a more compact design of the apparatus.

Aspect 3

In Aspect 1 or 2, the image forming apparatus includes a sheet conveyance path, such as the manual relay conveyance path 23, under the detachment component. The sheet conveyance path 23 allows sheets to be conveyed in the same direction as the attachment-detachment direction of the removable component, such as the writing device 4. In the present embodiment, the removable component is guided to its attachment position by the sheet conveyance rollers (specifically, the second manual relay conveyance roller 23*b* and the third manual relay conveyance roller 23*c*).

As described in the present embodiment, this allows for stable attachment and detachment of the writing device 4 as a removable component, while also reducing the number of parts, leading to cost savings and a more compact design of the apparatus.

Aspect 4

In Aspect 3, the sheet conveyance path includes a manual sheet conveyance path such as the manual relay conveyance path 23 for conveying a sheet fed from the manual feed tray 21.

This allows the sheet conveyance rollers in the manual relay conveyance path 23, or other manual conveyance paths, to be used as guides for a removable component such as the writing device 4.

Aspect 5

In any one of Aspects 1 to 4, when a removable component such as the writing device 4 is attached or detached, the sheet conveyance rollers are freely rotatable.

This allows the sheet conveyance rollers to rotate along with the removable component, as described in the present embodiment, enabling smooth attachment and detachment of the removable component. Additionally, the rotation of the sheet conveyance rollers prevents surface scratches and other damage to the sheet conveyance rollers caused by the attachment and detachment of the removable component.

Aspect 6

In any one of Aspects 1 to 4, when the sheet conveyance roller comes into contact with the removable component, such as the writing device 4, during attachment or detachment, the roller rotates in the attachment-detachment direction of the removable component and conveys the removable component.

This allows for the smooth attachment and detachment of the removable component, as described in the present embodiment. Additionally, when the removable component comes into contact with the sheet conveyance rollers during attachment or detachment, the rotation of the sheet conveyance rollers prevents surface scratches and other damage to the sheet conveyance rollers.

Aspect 7

In Aspect 5 or 6, when the removable component, such as the writing device 4, is attached or detached, the drive connection between the sheet conveyance rollers and the drive source, such as motor 101, that drives the sheet conveyance roller is disengaged.

This allows the sheet conveyance rollers to remain freely rotatable when attaching or detaching the removable component, such as the writing device 4.

Aspect 8

In any one of Aspects 1 to 7, when removable component, such as the writing device 4, is attached inside the main body of the image forming apparatus, the removable component is separated from the sheet conveyance roller.

This allows the removable component, such as the writing device 4, to be kept apart from the sheet conveyance roller when the removable component is attached to the main body and the image forming apparatus is ready for image formation. Thus, the sheet conveyance roller can rotate to convey the sheet without sliding against the removable component, preventing abnormal noise and reducing wear on the sheet conveyance roller.

Aspect 9

In Aspect 8, the image forming apparatus further includes: a fixed part to secure the removable component; and a fixing guide, such as the unit fixing portion 152, to guide a downstream end of the removable component (e.g., the writing device 4) in the horizontal direction (e.g., in the attachment direction) toward the fixed part while separating the downstream end of the removable component in the horizontal direction from the sheet conveyance roller.

As described in the present embodiment, this allows the removable component to be separated from the sheet conveyance roller, by the fixing guide 51, and also enable the downstream end of the removable component to be secured to a fixed part, such as the unit fixing portion 152. As a result, when the removable component is attached to the main body, the removable component remains separated from the sheet conveyance roller.

Aspect 10

In any one of Aspects 1 to 9, the image forming apparatus further includes: multiple sheet conveyance rollers including the sheet conveyance roller; a sheet guide member (e.g., the upper sheet guide member 123) supporting the multiple sheet conveyance rollers at set intervals in the horizontal direction (e.g., the attachment-detachment direction of the removable component (e.g., the writing device 4)), the sheet guide member to guide a sheet in the horizontal direction; and a protrusion (e.g., the guide protrusion **123*a***) between adjacent sheet conveyance rollers of the multiple sheet conveyance rollers on the sheet guide member, the protrusion protruding toward the detachable device.

According to this configuration, as described with reference to FIGS. 12A and 12B, when the removable component, such as the writing device 4, is attached to the main body of the image forming apparatus, the protrusion, such as the guide protrusion **123*a***, guide the downstream end of the removable component in the attachment direction away from the sheet guide member. This allows the downstream end of the removable component at the corner to be positioned away from the sheet guide member and higher than the top of the sheet conveyance roller. This allows the downstream end of the removable component at the corner to be prevented from striking the sheet conveyance roller during attachment, reducing the risk of damaging the sheet transport roller.

Aspect 11

In the image forming apparatus according any one of Aspects 1 to 10, the removable component (e.g., the writing device 4) includes a positioning protrusion **4*c* at a center of an upstream end of the removable component in the horizontal direction (e.g., in the attachment direction), in a vertical direction of the image forming apparatus (e.g., in a width direction of the stay member 53) orthogonal to the horizontal direction, and the sheet guide member further includes a stay member 53 supporting the upstream end of the removable component in the horizontal direction, the stay member including a positioning groove 53*c* at a center of the stay member 53** in the vertical direction, the positioning groove to engage with the positioning protrusion.

According to this configuration, as described in the present modification, when the upstream end of the removable component in the attachment direction is supported on the stay member 53, the positioning protrusion **4*c* can engage with the positioning groove 53*c*** to achieve accurate positioning.

Aspect 12

An image forming apparatus includes: a body; a sheet conveyor to convey a sheet in an interior of the body; a removable component detachably attachable to the interior of the body from one side face of the body. The sheet conveyor includes a sheet conveyance roller having: a first face to guide the sheet in the interior of the body; and a second face to guide the removable component during an attachment or a detachment of the removable component to or from the body.

Aspect 13

The image forming apparatus according to Aspect 12, further includes an image former to form an image on the sheet. The image former includes a photoconductor, and the removable component includes a writing device to emit light to the photoconductor and form an electrostatic latent image onto the photoconductor with the light.

Aspect 14

The image forming apparatus according to Aspect 12, further includes a guiding path to guide the removable component from the one side face of the body to a position in the interior of the body in an attachment-detachment direction during attachment of the removable component. The sheet conveyance roller guides the removable component along the guiding path during the attachment or detachment of the removable component, and the sheet conveyance roller conveys the sheet, along a sheet conveyance path disposed below the guiding path.

Aspect 15

The image forming apparatus according to Aspect 14, further includes a manual feed tray on the one side face of the body. The sheet conveyance roller conveys the sheet fed from the manual feed tray along the sheet conveyance path.

Aspect 16

The image forming apparatus according to Aspect 12, further includes a driver to drive the sheet conveyance roller. The sheet conveyance roller contacts the removable component and rotates during an attachment or detachment of the removable component to or from the body.

Aspect 17

In the image forming apparatus according to Aspect 12, the sheet conveyance roller rotates to guide the removable component along the guiding path in an attachment-detachment direction, in response to the sheet conveyance roller contacting the removable component during the attachment or detachment of the removable component.

Aspect 18

In the image forming apparatus according to Aspect 16, the driver includes a drive source to drive the sheet conveyance roller. The drive source is disconnected from the sheet conveyance roller during the attachment or the detachment of the removable component.

Aspect 19

In the image forming apparatus according to Aspect 12, the removable component is separated from the sheet conveyance roller with the removable component attached to a position in the interior of the body.

Aspect 20

The image forming apparatus according to Aspect 19 further includes: a fixed part to secure the removable component to the position in the interior of the body; and a fixing guide to guide a downstream end of the removable component toward the fixed part in an attachment direction of the removable component to attach the removable component to the position in the interior of the body while separating the downstream end of the removable component from the sheet conveyance roller.

Aspect 21

In the image forming apparatus according to Aspect 12, the sheet conveyor includes another sheet conveyance roller other than the sheet conveyance roller.

Aspect 22

The image forming apparatus according to Aspect 21, further includes a sheet guide member supporting the sheet conveyance roller and said another sheet conveyance roller at set intervals to guide a sheet along a sheet conveyance path; and a protrusion disposed between the sheet conveyance roller and said another sheet conveyor roller on the sheet guide member, the protrusion protruding toward the removable component. further includes: the sheet conveyor including another sheet conveyance roller other than the sheet conveyance roller; a sheet guide member supporting the sheet conveyance roller and said another sheet conveyance roller at set intervals to guide a sheet along the sheet conveyance path; and a protrusion disposed between the sheet conveyor roller and said another sheet conveyance roller on the sheet guide member, the protrusion protruding toward the removable component.

Aspect 23

In the image forming apparatus according to Aspect 22, the removable component includes a positioning protrusion at an upstream end of the removable component in an attachment direction, in which the removable component is attached to a position in the interior of the body. The positioning protrusion is at a central portion of the removable component in an orthogonal direction orthogonal to the attachment direction and a vertical direction of the image forming apparatus. The sheet guide member includes a stay member supporting the upstream end of the removable component, and the stay member having a positioning groove, at a central portion of the stay member in the orthogonal direction, to engage with the positioning protrusion.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:

a body;

a sheet conveyor to convey a sheet in an interior of the body along a sheet conveyance path; and a removable component detachably attachable to the interior of the body from one side face of the body, wherein the sheet conveyor includes a sheet conveyance roller positioned within the body between the removable component and the sheet conveyance path such that the sheet conveyance roller is configured to guide the sheet in the interior of the body along the sheet conveyance path and to guide the removable component during an attachment or a detachment of the removable component to or from the body.

2. The image forming apparatus according to claim 1, further comprising an image former to form an image on the sheet, wherein the image former includes a photoconductor, and the removable component includes a writing device to emit light to the photoconductor and form an electrostatic latent image onto the photoconductor with the light.

3. The image forming apparatus according to claim 1, further comprising a guiding path to guide the removable component from the one side face of the body to a position in the interior of the body in an attachment-detachment direction during the attachment of the removable component, wherein the sheet conveyance roller guides the removable component along the guiding path during the attachment or the detachment of the removable component, and the sheet conveyance roller conveys the sheet, along the sheet conveyance path disposed below the guiding path.

4. The image forming apparatus according to claim 3, further comprising a manual feed tray on the one side face of the body, wherein the sheet conveyance roller conveys the sheet fed from the manual feed tray along the sheet conveyance path.

5. The image forming apparatus according to claim 3, wherein the sheet conveyance roller rotates to guide the removable component along the guiding path in the attachment-detachment direction of the removable component, in response to the sheet conveyance roller contacting the removable component by the attachment or the detachment of the removable component to or from the body.

6. The image forming apparatus according to claim 1, further comprising a driver to drive the sheet conveyance roller, wherein the sheet conveyance roller contacts the removable component and rotates during the attachment or the detachment of the removable component to or from the body.

7. The image forming apparatus according to claim 6, wherein the driver includes a drive source to drive the sheet conveyance roller, and the drive source is disconnected from the sheet conveyance roller during the attachment or the detachment of the removable component to or from the body.

8. The image forming apparatus according to claim 1, wherein the removable component is separated from the sheet conveyance roller with the removable component attached to a position in the interior of the body.

9. The image forming apparatus according to claim 8, further comprising:

a fixed part to secure the removable component to the position in the interior of the body; and a fixing guide to guide a downstream end of the removable component toward the fixed part in an attachment direction of the removable component to attach the removable component to the position in the interior of the body while separating the downstream end of the removable component from the sheet conveyance roller.

10. The image forming apparatus according to claim 1, wherein the sheet conveyor includes another sheet conveyance roller other than the sheet conveyance roller.

11. The image forming apparatus according to claim 10, further comprising:

a sheet guide member supporting the sheet conveyance roller and said another sheet conveyance roller at set intervals to guide a sheet along the sheet conveyance path; and a protrusion disposed between the sheet conveyance roller and said another sheet conveyance roller on the sheet guide member, the protrusion protruding toward the removable component.

12. The image forming apparatus according to claim 11, wherein the removable component includes a positioning protrusion at an upstream end of the removable component in an attachment direction, in which the removable component is attached to a position in the interior of the body, the positioning protrusion is at a central portion of the removable component in an orthogonal direction orthogonal to the attachment direction and a vertical direction of the image forming apparatus, and the sheet guide member includes a stay member supporting the upstream end of the removable component, and the stay member having a positioning groove, at a central portion of the stay member in the orthogonal direction, to engage with the positioning protrusion.

* * * * *